(12) United States Patent
Aloni et al.

(10) Patent No.: US 10,528,446 B2
(45) Date of Patent: Jan. 7, 2020

(54) DELIVERING TROUBLESHOOTING SUPPORT TO A USER OF A COMPUTING DEVICE VIA A REMOTE SCREEN THAT CAPTURES THE USER'S INTERACTION WITH THE COMPUTING DEVICE

(71) Applicant: International Business Machines Corporation, Armonk, NY (US)

(72) Inventors: Miron Aloni, Rishon Lezion (IL); Rotem Klein, Kiryat Ono (IL); Daniel Lereya, Tel Aviv-Jaffa (IL); Vladimir Shalikashvili, Petah Tiqwa (IL); Moshe Weiss, Petah Tiqwa (IL)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 15/670,193

(22) Filed: Aug. 7, 2017

(65) Prior Publication Data
US 2019/0042387 A1    Feb. 7, 2019

(51) Int. Cl.
G06F 11/34    (2006.01)
G06F 11/07    (2006.01)
G06F 9/451    (2018.01)

(52) U.S. Cl.
CPC .......... *G06F 11/3438* (2013.01); *G06F 9/452* (2018.02); *G06F 11/0748* (2013.01); *G06F 11/0793* (2013.01)

(58) Field of Classification Search
CPC ............. G06F 11/0748; G06F 11/0793; G06F 11/3438; G06F 9/452
See application file for complete search history.

(56) References Cited

U.S. PATENT DOCUMENTS 6,195,637 B1 *  2/2001  Ballard ................... G10L 15/22
                                                704/235
7,343,529 B1 *  3/2008  Klinkner ............. G06F 11/0748
                                                707/999.202

(Continued)

OTHER PUBLICATIONS

Nakamura, T. and Igarashi, T. "An Application-Independent System for Visualizing User Operation History". ACM UIST'08. Oct. 19-22, 2008. pp. 23-32. (Year: 2008).*

(Continued)

*Primary Examiner* — Jonh M MacIlwinen
(74) *Attorney, Agent, or Firm* — Francis Lammes; Stephen J. Walder, Jr.; Robert M. Sullivan (57) ABSTRACT

A mechanism is provided for delivering troubleshooting support that captures a user's interactions with a local computing device. Responsive to receiving a set of events associated with an issue being experienced by the user of the local computing device, each event in the set of events is presented to a technician. Each event in the set of events is flagged as either correct or incorrect. Responsive to the incorrect flagged event being an operation performed by the local computing device, a communicative connecting is established to the local computing device in order that the technician corrects a future operation corresponding to the operation performed. Responsive to the incorrect flagged event being an action performed by the user of the local computing device, an analysis is sent in order to inform the user of incorrect actions so as to not perform the incorrect actions in the future.

20 Claims, 3 Drawing Sheets

(56) References Cited

U.S. PATENT DOCUMENTS

| | | | | |
|---|---|---|---|---|
| 7,676,690 | B2* | 3/2010 | Bucher | H04L 67/1095 |
| | | | | 714/6.12 |
| 8,589,489 | B2 | 11/2013 | Bomgaars et al. | |
| 8,745,199 | B1 | 6/2014 | Yee et al. | |
| 8,866,701 | B2 | 10/2014 | Momchilov et al. | |
| 9,384,082 | B1* | 7/2016 | Lee | G06F 11/3034 |
| 2006/0005132 | A1* | 1/2006 | Herdeg | G06F 9/45512 |
| | | | | 715/704 |
| 2007/0277061 | A1* | 11/2007 | Ashe | G06F 11/0748 |
| | | | | 714/57 |
| 2008/0263404 | A1* | 10/2008 | Vidiyala | G06F 11/0748 |
| | | | | 714/38.14 |
| 2011/0004888 | A1 | 1/2011 | Srinivasan et al. | |
| 2011/0154117 | A1* | 6/2011 | Danielson | G06F 11/0748 |
| | | | | 714/37 |
| 2017/0192952 | A1* | 7/2017 | Lehmann | G06F 17/246 |

OTHER PUBLICATIONS

"Spark View", Remote Spark Corp., Spark View, Administrator's Manual, Version 4.8.8, Sep. 11, 2016, 67 pages.
"ThinLinc Terminal Server", Cendio, https://www.cendio.com/whitepapers/thinlinc-whitepaper.pdf, ThinLinc Whitepaper, (month known) 2015, 2 pages.

* cited by examiner

DELIVERING TROUBLESHOOTING SUPPORT TO A USER OF A COMPUTING DEVICE VIA A REMOTE SCREEN THAT CAPTURES THE USER'S INTERACTION WITH THE COMPUTING DEVICE

BACKGROUND

The present application relates generally to an improved data processing apparatus and method and more specifically to mechanisms for delivering troubleshooting support to a user of a computing device via a remote screen that captures the user's interactions with the computing device.

In computing, the term remote desktop refers to a software or operating system feature that allows a personal computer's desktop environment to be run remotely from another system, either another personal computer or server, while being displayed on both the remote computer (server) and the personal computer (client). Remote access may also be explained as remote control of the personal computer by using the remote computer connected via the Internet or another network. This is widely used by many computer manufacturers and large businesses' help desks for technical troubleshooting of their customers' problems.

Remote access software captures the remote technician's mouse and keyboard input performed on the local computer (client) and sends the resultant actions performed on the local computer to the remote computer (server). The remote computer in turn displays the action performed on the local computer on the remote computer. Remote desktop sharing is accomplished through a common client/server model. The client, or Virtual Network Computing (VNC) viewer, is installed on a local computer and then connects to the network via a server component, which is installed on a remote computer. In a typical VNC session, all keystrokes and mouse clicks are registered as if the client were actually performing tasks on the local computer, even though the technician is actually the one performing the keystrokes a mouse click from the remote computer.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for delivering troubleshooting support to a user of a local computing device that captures the user's interactions with the local computing device. The illustrative embodiment presents each event in a set of events to a technician via a graphical user interface of a remote computing device in response to receiving the set of events associated with an issue being experienced by the user of the local computing device. For each event, the illustrative embodiment flags the event as either correct or incorrect in response to receiving an indication as to whether the event is correct or incorrect. For each incorrect flagged event, the illustrative embodiment annotates the event with a received annotation in response to receiving an annotation of an incorrect procedure associated with the incorrect flagged event. The illustrative embodiment communicatively connects to the local computing device in order that the technician corrects a future operation corresponding to the operation performed by the local computing device in response to the incorrect flagged event being an operation performed by the local computing device. The illustrative embodiment sends an analysis in order to inform the user of incorrect actions so as to not perform the incorrect actions in the future in response to the incorrect flagged event being an action performed by the user of the local computing device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for delivering troubleshooting support to a user of a computing device through a remote screen that captures the user's interactions with the computing device. As noted previously, remote access software captures the remote technician's mouse and keyboard input performed on the local computer (client) and sends the resultant actions performed on the local computer to the remote computer (server). The remote computer in turn displays the action performed on the local computer on the remote computer. Remote desktop sharing is accomplished through a common client/server model. The client, or Virtual Network Computing (VNC) viewer, is installed on a local computer and then connects to the network via a server component, which is installed on a remote computer. In a typical VNC session, all keystrokes and mouse clicks are registered as if the client were actually performing tasks on the local computer, even though the technician is actually the one performing the keystrokes a mouse click from the remote computer.

However, current remote access software provides no information to the technician of the remote computer as to how the user of the local computer interacts with the local computer. That is, while the a technician accesses the local computer using the remote access server and is able to diagnose issues with the applications, the operating system, hardware, or the like, the technician is not able to see if the user's interaction with the local computer is the cause of the issues that are occurring with the local computer. Thus, if there is an issue occurring on the local computer that the user needs support to address, the technician is unaware the user's actions and is unable to see what the user is doing step by step.

To address this issue, the illustrative embodiments provide mechanisms for delivering troubleshooting support to a user of a computing device via a remote screen that captures the user's interactions with the computing device. The remote screen mechanism captures all keystrokes and mouse clicks performed by the user of the local computer when the remote screen software is enabled. Thus, every action performed by the user and every resultant operations performed by the local computing device is captured and transferred to an associated remote screen mechanism on a remote computer of the technician for analysis. The transfer of data from the local computer to the remote computer may be in real time or delayed depending on the type of analysis being performed. That is, the user of the local computer may be encountering an issue that needs to be investigated but is not a priority. Thus, the actions and resultant operation may be captured at one time and later sent for analysis. However, if the issue is a priority, the actions and resultant operations may be sent in real time for immediate analysis by the technician.

Once the data is transferred to the remote computer, the remote screen mechanism on the remote computer parses the actions and resultant operations, hereinafter referred to as events, so that the technician may analyze each event as they occur. That is, the technician may play, pause, rewind, or the like, the events one-by-one, so that each event may be analyzed for correctness. The technician analyzes each event in order to determine which event is the cause of the issue being experienced by the user. By performing analysis in this manner, the technician is able to identify whether the event that is causing the issue is an action being performed by the user or an operation being performed by the local computer as a result of an action being performed by the user thereby delivering troubleshooting support to a user of a computing device that accurately detects the cause of an issue even if the issue is being caused by the user.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
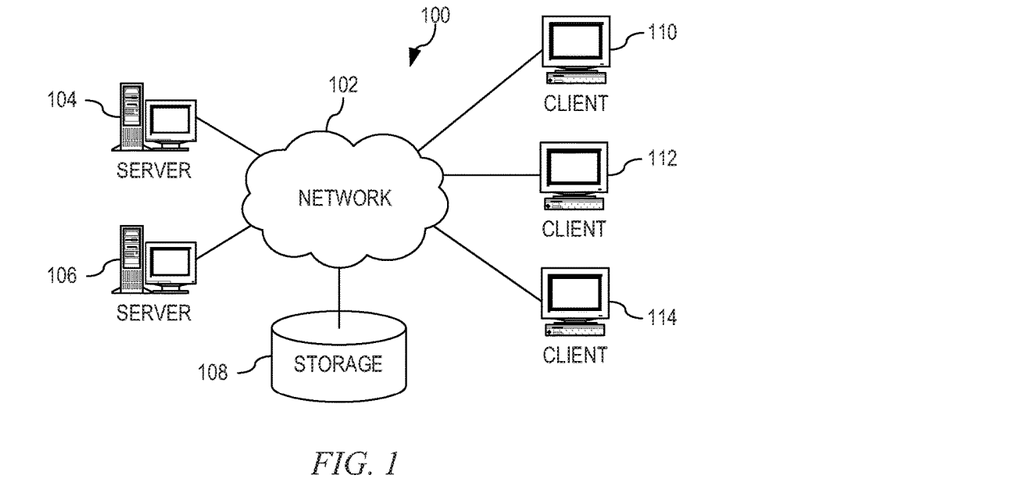
FIG. 1 is an example diagram of a distributed data processing system in which aspects of the illustrative embodiments may be implemented.
Figure 2:
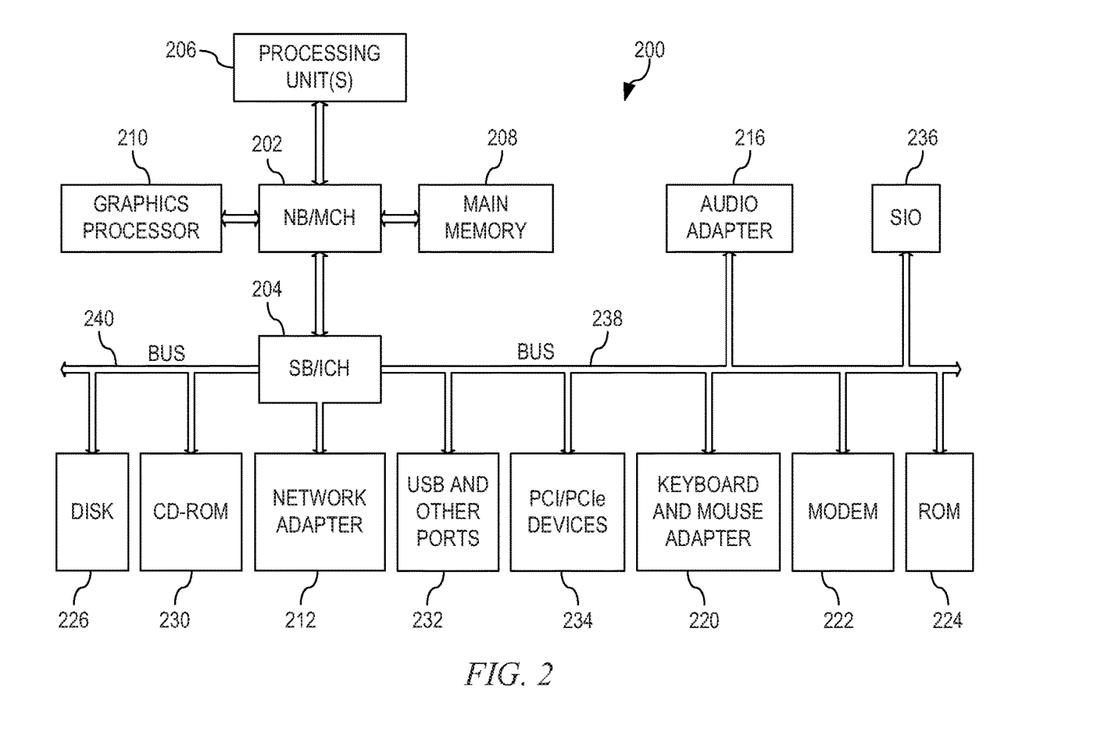
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, storage device, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a remote screen mechanism for delivering troubleshooting support to a user of a computing device through a remote screen that captures the user's interactions with the computing device. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates delivering troubleshooting support to a user of a computing device through a remote screen that captures the user's interactions with the computing device.

As noted above, the mechanisms of the illustrative embodiments utilize specifically configured computing devices, or data processing systems, to perform the operations for delivering troubleshooting support to a user of a computing device through a remote screen that captures the user's interactions with the computing device. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to a remote screen mechanism that delivers troubleshooting support to a user of a computing device through a remote screen that captures the user's interactions with the computing device.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
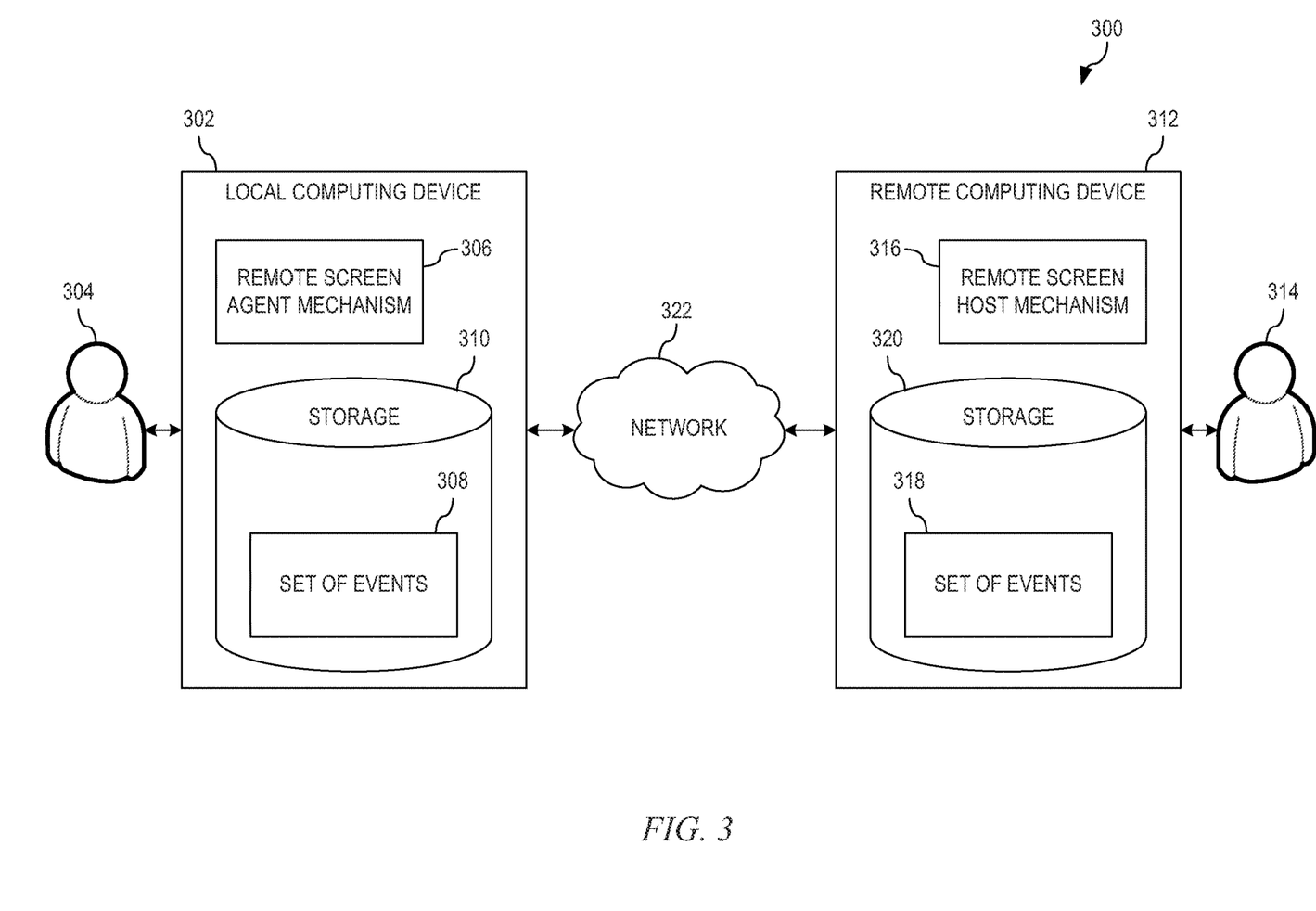
FIG. 3 depicts a functional block diagram of a remote screen mechanism that delivers troubleshooting support to a user of a computing device through a remote screen that captures the user's interactions with the computing device in accordance with an illustrative embodiment.

FIG. 3 depicts a functional block diagram of a remote screen mechanism that delivers troubleshooting support to a user of a computing device through a remote screen that captures the user's interactions with the computing device in accordance with an illustrative embodiment. Distributed data processing system 300 comprises local computing device 302 coupled to remote computing device 312, which may both be devices, such as personal computers, network computers, storage device, servers, or the like. Local computing device 302 may be coupled to remote computing device 312 through a network 322 that is, for example, the Internet, a local area network, a wide area network and/or a wireless network.

Local computing device 302, which is operated by user 304, comprises remote screen agent mechanism 306. When enable, remote screen agent mechanism 306 captures all keystrokes, mouse clicks, or the like, performed by user 304 when interacting with local computing device 302. Additionally, remote screen agent mechanism 306 captures all operations resulting from the keystrokes, mouse clicks, or the like, that local computing device 302 performs. Responsive to remote screen agent mechanism 306 being enable, a communication connection is established through network 322 to remote screen host mechanism 316. Then, as remote screen agent mechanism 306 captures the keystrokes, mouse clicks, or the like, performed by user 304 and the resultant operations performed by local computing device 302, hereinafter referred to as a set of events 308, remote screen agent mechanism 306 stores the set of events 308 in local storage 310 and sends the set of events 308 to remote screen host mechanism 316 over the communication connection.

Upon receiving the events from remote screen agent mechanism 306, remote screen host mechanism 316 stores the events as a set of events 318 associated with local computing device 302 in local storage 320 for analysis. Technician 314 then interacts with remote screen host mechanism 316 and remote computing device 312 to analyze the set of events 318 one-by-one. That is, when technician 314 begins analysis of the set of events 318, remote screen host mechanism 316 parses each event in the set of events thereby separating the set of events into individually analyzable events based on, for example, actions performed by the user, operations performed by the local computing device, or the like. Remote screen host mechanism 316 performs this parsing by analyzing the associated event metadata that identifying commands received by, for example, the mouse, keyboard, or other peripheral device, and metadata identify operation performed by the processor, in response to the received commands. This way, technician 314 may analyze each event one-by-one for correctness.

During analysis of each event, technician 314 may interact with remote screen host mechanism 316 to play, pause, rewind, or the like, the event so that the event may be analyzed for correctness. Technician 314 may tag each event with either an incorrect flag or correct flag during the analysis. Once the event is tagged, remote screen host mechanism 316 may determine whether there is another event to analyze. If there is another event, then remote screen host mechanism 316 presents the next event to technician 314 for analysis. If there is not another event, remote screen host mechanism 316 may present those events that are flagged as incorrect for follow-up annotation by technician 314. It should be noted that technician 314 may also annotate any incorrect events during the initial analysis.

Once all the events have been analyzed and annotated, technician 314 may prepare an analysis document for the set of events 318 indicating those events that were incorrect. If incorrect events are identified that occurred in the operations performed by local computing device 302, then technician 314 may communicatively connect to local computing device 302 through remote screen host mechanism 316 and remote screen agent mechanism 306 to correct those issues with local computing device 302. If incorrect events are identified that occurred in the actions performed by user 304 of local computing device 302, then technician 314 may send the analysis document to user 304 so that the user may be informed of the of the incorrect actions so as to not perform the incorrect actions again.

Accordingly, by performing analysis in this manner, technician 314 is able to identify whether one or more events causing the issue is an action being performed by user 304 or is an operation being performed by local computing device 302 as a result of an action being performed by user 304. Thus, remote screen host mechanism 316 and remote screen agent mechanism 306 operate in conjunction with one another to delivering troubleshooting support to user 304 of local computing device 302 and accurately detects the cause of an issue regardless of whether the issue is caused by user 304 or local computing device 304.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
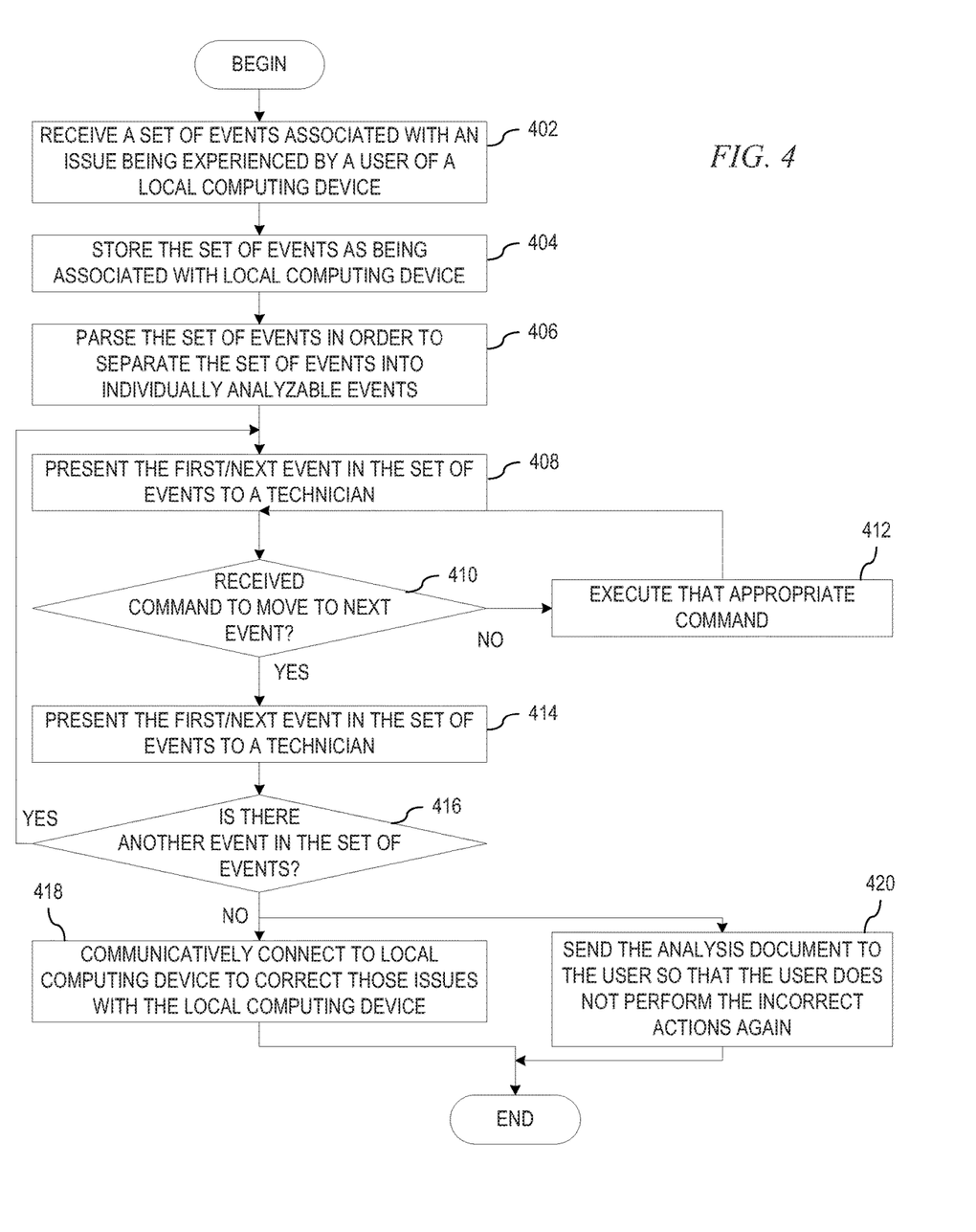
FIG. 4 depicts one exemplary flow diagram of the operations performed by a remote screen mechanism in delivering troubleshooting support to a user of a computing device that captures the user's interactions with the computing device in accordance with an illustrative embodiment.

FIG. 4 depicts one exemplary flow diagram of the operations performed by a remote screen mechanism in delivering troubleshooting support to a user of a computing device that captures the user's interactions with the computing device in accordance with an illustrative embodiment. As the operation begins, a remote screen host mechanism executing on a remote computing device receives a set of events associated with an issue being experienced by a user of a local computing device (step 402). The remote screen host mechanism stores the set of events as being associated with local computing device (step 404). The remote screen host mechanism parses the set of events in order to separate the set of events into individually analyzable events (step 406) based on, for example, actions performed by the user, operations performed by the local computing device, or the like. The remote screen host mechanism performs this parsing by analyzing the associated event metadata that identifying commands received by, for example, the mouse, keyboard, or other peripheral device, and metadata identify operation performed by the processor, in response to the received commands. The remote screen host mechanism then presents the first/next event in the set of events to a technician analyzing the events in a graphical user interface of a remote computing device (step 408).

During analysis of each event, the remote screen host mechanism may receive a command from the technician to perform an operations such as to play, pause, rewind, or the like, the event; to tag the event with either an incorrect flag or correct flag; to annotate the event as feedback to the user; or to move to next event (step 410). If at step 410 the remote screen host mechanism detects an action other than to move to the next event, the remote screen host mechanism executes that appropriate command with regard to the current event (step 412), with the operation returning to step 410 thereafter. If at step 410 the remote screen host mechanism detects a command to move to the next event, the remote screen host mechanism determines whether there is another event in the set of events (step 414). If at step 414 there is another event in the set of events, the operation returns to step 408.

If at step 414 there is not another event, the remote screen host mechanism presents those events that are flagged as incorrect to the technician at which time the technician may prepare an analysis document for the set of events indicating those events that were incorrect (step 416). If an incorrect event is identified that occurred in the operations performed by local computing device, the technician may communicatively connect to local computing device through remote screen host mechanism and a remote screen agent mechanism operating on the local computing device to correct those issues with the local computing device (step 418). If incorrect events are identified that occurred in the actions performed by the user of the local computing device, the technician may cause the remote screen host mechanism to send the analysis document to the user so that the user may be informed of the of the incorrect actions so as to not perform the incorrect actions again (step 420). Once all the incorrect events are addressed at steps 418 and 420, the remote screen host mechanism end operations.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for delivering troubleshooting support to a user of a computing device via a remote screen that captures the user's interactions with the computing device. The remote screen mechanism captures all keystrokes, mouse clicks, or the like, performed by the user of the local computing device when the remote screen software is enabled. Every action performed by the user and every resultant operations performed by the local computing device is captured and transferred to an associated remote screen mechanism on a remote computer of the technician for analysis. Once the data is transferred to the remote computer, the remote screen mechanism on the remote computer parses the actions and resultant operations, i.e. events, so that the technician may analyze each event as they occur. The technician plays, pauses, rewinds, or the like, the events one-by-one, so that each event may be analyzed for correctness. By performing analysis in this manner, the technician is able to identify whether the event that is causing the issue is an action being performed by the user or an operation being performed by the local computer as a result of an action being performed by the user thereby delivering troubleshooting support to a user of a computing device that accurately detects the cause of an issue even if the issue is being caused by the user.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a remote computing device comprising a processor and a memory coupled to the processor, for delivering troubleshooting support to a user of a local computing device that captures the user's interactions with the local computing device, the method comprising:
    responsive to receiving a set of events associated with an issue being experienced with the local computing device by the user of the local computing device, presenting, by the processor, each event in the set of events to a technician via a graphical user interface of a remote computing device;
    for each event, responsive to receiving an indication as to whether the event is correct or incorrect, flagging, by the processor, the event as either correct or incorrect;
    for each incorrect flagged event, responsive to receiving an annotation of an incorrect procedure associated with the incorrect flagged event, annotating, by the processor, the event with the received annotation;
    responsive to the incorrect flagged event being an operation performed incorrectly by the local computing device, communicatively connecting, by the processor, to the local computing device in order that the technician corrects a future operation corresponding to the operation performed by the local computing device; and
    responsive to the incorrect flagged event being an action performed incorrectly by the user of the local computing device, sending, by the processor, an analysis in order to inform the user of incorrect user actions so as to not perform the incorrect user actions in the future.

2. The method of claim 1, further comprising:
    parsing, by the processor, the set of events in order to separate the set of events into individually analyzable events.

3. The method of claim 2, wherein parsing the set of events in order to separate the set of events into the individually analyzable events comprises:
    analyzing, by the processor, event metadata associated with each event in the set of events to identify commands received from a peripheral device and operations performed by the processor in response to the received commands.

4. The method of claim 1, wherein, as the technician analyzes each event in the set of event, the technician is able to perform one or more of playing the event, pausing the event, rewinding the event, moving to a next event.

5. The method of claim 1, wherein the analysis provided to the user of the local computing device incudes the annotations included by the technician.

6. The method of claim 1, wherein the technician is analyzing the events at a same time as the user of the local computing device is performing actions associated with the set of events.

7. The method of claim 1, wherein the technician is analyzing the events at a time later than when the user of the local computing device performed actions associated with the set of events.

8. A computer program product comprising a non-transitory computer readable storage medium having a computer readable program stored therein, wherein the computer readable program, when executed on a computing device, causes the computing device to:
    responsive to receiving a set of events associated with an issue being experienced with the local computing device by a user of a local computing device, present each event in the set of events to a technician via a graphical user interface of a remote computing device;
    for each event, responsive to receiving an indication as to whether the event is correct or incorrect, flag the event as either correct or incorrect;
    for each incorrect flagged event, responsive to receiving an annotation of an incorrect procedure associated with the incorrect flagged event, annotate the event with the received annotation;
    responsive to the incorrect flagged event being an operation performed incorrectly by the local computing device, communicatively connect to the local computing device in order that the technician corrects a future operation corresponding to the operation performed by the local computing device; and
    responsive to the incorrect flagged event being an action performed incorrectly by the user of the local computing device, send an analysis in order to inform the user of incorrect user actions so as to not perform the incorrect user actions in the future.

9. The computer program product of claim 8, wherein the computer readable program further causes the computing device to:
    parse the set of events in order to separate the set of events into individually analyzable events.

10. The computer program product of claim 9, wherein the computer readable program to parse the set of events in order to separate the set of events into the individually analyzable events further causes the computing device to:
    analyze event metadata associated with each event in the set of events to identify commands received from a peripheral device and operations performed by the processor in response to the received commands.

11. The computer program product of claim 8, wherein, as the technician analyzes each event in the set of event, the technician is able to perform one or more of playing the event, pausing the event, rewinding the event, moving to a next event.

12. The computer program product of claim 8, wherein the analysis provided to the user of the local computing device incudes the annotations included by the technician.

13. The computer program product of claim 8, wherein the technician is analyzing the events at a same time as the user of the local computing device is performing actions associated with the set of events.

14. The computer program product of claim 8, wherein the technician is analyzing the events at a time later than when the user of the local computing device performed actions associated with the set of events.

15. An apparatus comprising:
a processor; and
a memory coupled to the processor, wherein the memory comprises instructions which, when executed by the processor, cause the processor to:
responsive to receiving a set of events associated with an issue being experienced with the local computing device by a user of a local computing device, present each event in the set of events to a technician via a graphical user interface of a remote computing device;
for each event, responsive to receiving an indication as to whether the event is correct or incorrect, flag the event as either correct or incorrect;
for each incorrect flagged event, responsive to receiving an annotation of an incorrect procedure associated with the incorrect flagged event, annotate the event with the received annotation;
responsive to the incorrect flagged event being an operation performed incorrectly by the local computing device, communicatively connect to the local computing device in order that the technician corrects a future operation corresponding to the operation performed by the local computing device; and
responsive to the incorrect flagged event being an action performed incorrectly by the user of the local computing device, send an analysis in order to inform the user of incorrect user actions so as to not perform the incorrect user actions in the future.

16. The apparatus of claim 15, wherein the instructions thither cause the processor to:
parse the set of events in order to separate the set of events into individually analyzable events, wherein the instructions to parse the set of events in order to separate the set of events into the individually analyzable events further cause the processor to:
analyze event metadata associated with each event in the set of events to identify commands received from a peripheral device and operations performed by the processor in response to the received commands.

17. The apparatus of claim 15, wherein, as the technician analyzes each event in the set of event, the technician is able to perform one or more of playing the event, pausing the event, rewinding the event, moving to a next event.

18. The apparatus of claim 15, wherein the analysis provided to the user of the local computing device incudes the annotations included by the technician.

19. The apparatus of claim 15, wherein the technician is analyzing the events at a same time as the user of the local computing device is performing actions associated with the set of events.

20. The apparatus of claim 15, wherein the technician is analyzing the events at a time later than when the user of the local computing device performed actions associated with the set of events.

\* \* \* \* \*